(12) United States Patent
Fredriksson et al.

(10) Patent No.: US 10,539,448 B2
(45) Date of Patent: Jan. 21, 2020

(54) RADAR LEVEL GAUGE WITH HIGH TEMPERATURE, HIGH PRESSURE (HTHP) PROCESS SEAL

(71) Applicant: Rosemount Tank Radar AB, Mölnlycke (SE)

(72) Inventors: Håkan Fredriksson, Linköping (SE); Peter Elmberg, Mölndal (SE)

(73) Assignee: ROSEMOUNT TANK RADAR AB, Molnlycke (SE)

( * ) Notice: Subject to any disclaimer, the term of this patent is extended or adjusted under 35 U.S.C. 154(b) by 541 days.

(21) Appl. No.: 15/299,976

(22) Filed: Oct. 21, 2016

(65) Prior Publication Data
US 2018/0113020 A1 Apr. 26, 2018

(51) Int. Cl.
*G01F 23/284* (2006.01)
(52) U.S. Cl.
CPC ................... *G01F 23/284* (2013.01)
(58) Field of Classification Search
CPC .................................................... G01F 23/284
USPC ........................................................ 342/124
See application file for complete search history.

(56) References Cited

U.S. PATENT DOCUMENTS

| | | | | |
|---|---|---|---|---|
| 4,972,967 A * | 11/1990 | Nelson | ................ | B29C 44/1247 122/19.2 |
| 5,040,697 A * | 8/1991 | Nelson | ................ | B29C 44/1247 122/19.2 |
| 5,421,475 A * | 6/1995 | Nelson | ................ | B29C 44/1247 122/19.2 |
| 5,495,218 A * | 2/1996 | Erb | ............................ | H01P 1/08 333/248 |
| 5,509,566 A * | 4/1996 | Nelson | ................ | B29C 44/1247 122/19.2 |
| 2002/0124644 A1* | 9/2002 | Lubbers | ................ | G01F 23/284 73/290 R |
| 2002/0126061 A1* | 9/2002 | Griessbaum | .......... | G01F 23/284 343/786 |

(Continued)

FOREIGN PATENT DOCUMENTS

EP 2116820 A1 5/2008

OTHER PUBLICATIONS

Wikepedia Article, "Hooke's Law", Oct. 18, 2016 (Year: 2016).*

(Continued)

*Primary Examiner* — Frank J McGue
(74) *Attorney, Agent, or Firm* — Westman, Champlin & Koehler, P.A.

(57) ABSTRACT

A radar level gauge comprising a directional antenna, a hollow wave guide connected to the antenna, a tank connection having a through hole with an annular abutment, a dielectric filling member arranged in the tank connection, the dielectric filling member comprising an annular collar portion resting against the annular abutment, a clamping member inserted into the tank connection, a fastening member attached to the fixed tank connection to secure the clamping member between the fastening member and the annular abutment, and a spring member arranged between the fastening member and the clamping member. The spring member presses the clamping member towards the annular abutment, to apply a controlled pressure on the annular collar portion, allowing the annular collar portion to serve as a pressure tight sealing between a tank interior and a tank exterior.

27 Claims, 4 Drawing Sheets

(56) References Cited

U.S. PATENT DOCUMENTS

2007/0084281 A1\* 4/2007 Fredriksson .......... G01F 23/284
                                                                             73/290 R
2014/0266862 A1\* 9/2014 Fredriksson .......... G01F 23/284
                                                                             342/124

OTHER PUBLICATIONS

Notification of Transmittal of the International Search Report and the Written Opinion of the International Searching Authority, from PCT/EP2017/076874, dated Feb. 7, 2018.

\* cited by examiner

RADAR LEVEL GAUGE WITH HIGH TEMPERATURE, HIGH PRESSURE (HTHP) PROCESS SEAL

FIELD OF THE INVENTION

The present invention relates to a radar level gauge having a process seal capable of withstanding high pressure and high temperature.

BACKGROUND OF THE INVENTION

Radar level gauges (RLGs) are suitably used for making measurements of the level of products such as process fluids, granular compounds and other materials contained in a tank. An example of such a radar level gauge can include a transceiver for transmitting and receiving microwaves, a directional antenna arranged to direct microwaves towards the surface and to return microwaves reflected by the surface to the transceiver, and processing circuitry adapted to determine the filling level based on a relation between microwaves transmitted and received by the transceiver.

The directional antenna is adapted to emit free propagating electromagnetic waves into the tank and receive a reflection of those waves. Such an RLG is sometimes referred to as a non-contact RLG. The antenna may be adapted to a specific frequency band. The currently most used frequency bands have center frequencies of around 6 GHz or 24 GHz, although higher frequency bands may also be contemplated.

In one conventional design the wave guide arrangement comprises a hollow wave guide which extends through the tank wall, and connects the directional antenna to the transceiver circuitry. The wave guide and/or antenna can be filled with a dielectric filling member (plug) to prevent tank content from entering the antenna and/or wave guide. Sealing elements, such as o-rings or the like, are typically arranged around the plug to provide a process seal ensuring that the contents of the tank are not released into the outside environment. The process seal may be pressure tight.

The dielectric material in the filling member is selected to have suitable dielectric properties, and is also preferably hydrophobic, i.e. repelling to water. However, such materials, e.g. PTFE, are typically also relatively soft, and affected by elevated temperatures. Under conditions of varying temperatures, a soft dielectric filling member, such as a PTFE filling member, may therefore move in relation to the surrounding antenna and wave guide, which is typically made of steel. Such movement may cause the sealing provided by the sealing elements to be degraded, leading to imperfect tank sealing.

Further, conventional sealing elements such as O-rings, are typically susceptible to deterioration when subjected to aggressive chemicals.

GENERAL DISCLOSURE OF THE INVENTION

It is an object of the present invention to mitigate these problems and provide a radar level gauge with improved sealing of the feed through structure, and reduced risk of signal transmission deterioration.

According to a first aspect of the invention, this object is achieved by a radar level gauge using electromagnetic waves for determining a filling level of a product in a tank, the radar level gauge comprising a transceiver for transmitting an electromagnetic transmit signal and receiving an electromagnetic echo signal, processing circuitry connected to the transceiver for determining the filling level based on the electromagnetic echo signal, a directional antenna for directing the electromagnetic transmit signal towards a surface of the product and to return a reflection from the surface as the electromagnetic echo signal, a hollow wave guide connecting the transceiver with the antenna, a tank connection arranged to be sealingly secured to the tank, the fixed tank connection having a through hole with an annular abutment, a dielectric filling member arranged in the tank connection and configured to prevent entry of tank content into the antenna and/or hollow wave guide, the dielectric filling member comprising an annular collar portion resting against the annular abutment, a clamping member inserted into the tank connection, such that the annular collar portion is sandwiched between the annular abutment and the clamping member, a fastening member attached to the fixed tank connection thereby securing the clamping member between the fastening member and the annular abutment, and a spring member arranged between the fastening member and the clamping member, and configured to press the clamping member towards the annular abutment, so as to apply a controlled pressure on the annular collar portion, allowing the annular collar portion to serve as a pressure tight sealing between a tank interior and a tank exterior.

With this design, the sandwiched and pressurized annular collar portion of the dielectric filling member may serve as a tank seal without requiring any additional sealing members such as O-rings. A sealing according to an embodiment of the invention has been tested to withstand a pressure of 100 Bar at room temperature. Further, the pressure applied on (part of) the annular collar portion will ensure that the dielectric filling member provides pressure tight sealing also at elevated temperatures, when the (typically soft) dielectric filling member is subject to movement and deformation.

By "annular collar portion" is intended an impermeable portion which continuously extends from the center of the filling member at least beyond the peripheral edge of the annular abutment in the tank connection. When pressed against the annular abutment, this portion will thus provide the pressure tight sealing.

It is noted that clamping of a sealing element made of PTFE is known in the art, e.g. by U.S. Pat. No. 5,495,218. However, U.S. Pat. No. 5,495,218 relates to a separate annular sealing element, similar in function to an O-ring. Quite different from this prior art design, the annular collar portion of the present invention forms an integral part of the dielectric filling member filling arranged in the tank connection.

The force to be applied by the spring member depends on the pressure that the sealing is subjected to from the tank, and the surface area of the sealing, essentially the surface of the part of the collar portion which is sandwiched between the tank connection and the clamping member. As an example, the required force may be in the order of 20 kN.

The spring member may have a linear spring constant, so that the applied force is proportional to the compression of the spring. The spring member is then compressed to an extent such that the required spring force is obtained.

In order to further improve the sealing, the annular abutment can be provided with a serrated surface where it makes pressurized contact with the annular collar portion.

It is noted that in the following disclosure and claims, the expressions "inner" and "outer" may be used to indicate relative position with respect to the process seal. An "inner" part is thus inside the tank seal (high pressure side), while an "outer" part is outside the tank seal (low pressure side).

Part of the through hole of the tank connection may form an inner part of the hollow wave guide which is filled by the dielectric filling member. In some embodiments, the RLG further comprises a tank connection adaptor inserted in the tank connection, and arranged to rest against an interior annular abutment formed in the tank connection. The tank connection adaptor then comprises a channel which forms an inner part of the hollow waveguide.

Independently of this, the (interior part of the) tank connection may form part of the antenna, which may be filled by the dielectric filling member. The antenna may alternatively by a separate structure from the tank connection, and be attached to the interior end of the tank connection.

The RLG may further comprise at least one ventilation passage providing fluid contact between the annular collar portion and an exterior of the tank. With this design, any leakage of water or tank content that is forces passed the process seal, will be guided by the collar portion to the ventilation channel(s) and can be ventilated out of the gauge to prevent it from reaching the circuitry. The ventilation passage may be extend from a peripheral edge of the collar portion the exterior.

Although the pressurized collar of the filling member will ensure sealing of the tank, additional sealing may be advantageous to prevent entry of water or moisture from the exterior into the waveguide. For this reason, the wave guide arrangement may comprise an outer sealing element arranged between the annular collar portion and the fastening member. This sealing member is thus located on the exterior side of the process seal. In case the gauge comprises a ventilation passage as mentioned above, the outer sealing member may be arranged between the ventilation passage and an outer portion of the waveguide.

The dielectric filling member is made of a dielectric material having suitable electromagnetic properties, as well as being resistant to the content in the tank, typically petroleum products. In addition to these properties, the dielectric filling member preferably is hydrophobic, i.e. repels water. Examples of materials conventionally used as dielectric filling members in radar level gauges include PTFE (polytetrafluoroethylene), PFA (perfluoroalkoxy alkane), FEP (fluorinated ethylene propylene), PPS (polyphenylene sulfide), and PEEK (polyether ether ketone.

In some embodiments, the clamping member comprises a channel which forms an outer part of the hollow wave guide. Such a design may be combined with an inner hollow wave guide formed by the tank connection or a tank connection adaptor.

In this case, the radar level gauge may further comprise an outer dielectric filling member made of a second dielectric material, which second filling member is arranged in the outer wave guide portion so as to be fixed in the wave guide at least in a direction out from said tank, and wherein the second dielectric material is configured to withstand temperatures up to 250 degrees Celsius, or even 500 degrees Celsius.

By dividing the dielectric filling member into (at least) two portions, the outer portion may be made of a structurally strong and temperature resistant material, which can be fastened in the wave guide, and thus hold the inner portion in place, also when this lower portion is softened by elevated temperatures. During conditions of temperatures sufficiently high to soften the inner filling member, the outer filling member will thus serve to prevent the first filling member from being forced out of the wave guide.

A design with two separate wave guide filling members requires adequate sealing. If the sealing of the wave guide is imperfect, any leakage (e.g. water or tank content) may reach an interface surface between separate dielectric filling members. A layer of e.g. water on such an interface may significantly impair the transmission of electromagnetic signals through the wave guide. Therefore, sealing provided by a pressurized collar portion according to the present invention may be particularly advantageous in this context.

In order to be fixed in the wave guide, the outer filling member needs to be structurally strong and form stable. The expression "withstand temperatures" is intended to mean that the outer filling member will not lose its form stability, nor melt or deteriorate chemically. In brief, the outer filling member will act as a "plug" also at elevated temperatures. For example, the outer filling member may be made of a ceramic material, such as aluminum oxide, of an epoxy resin, or of glass.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
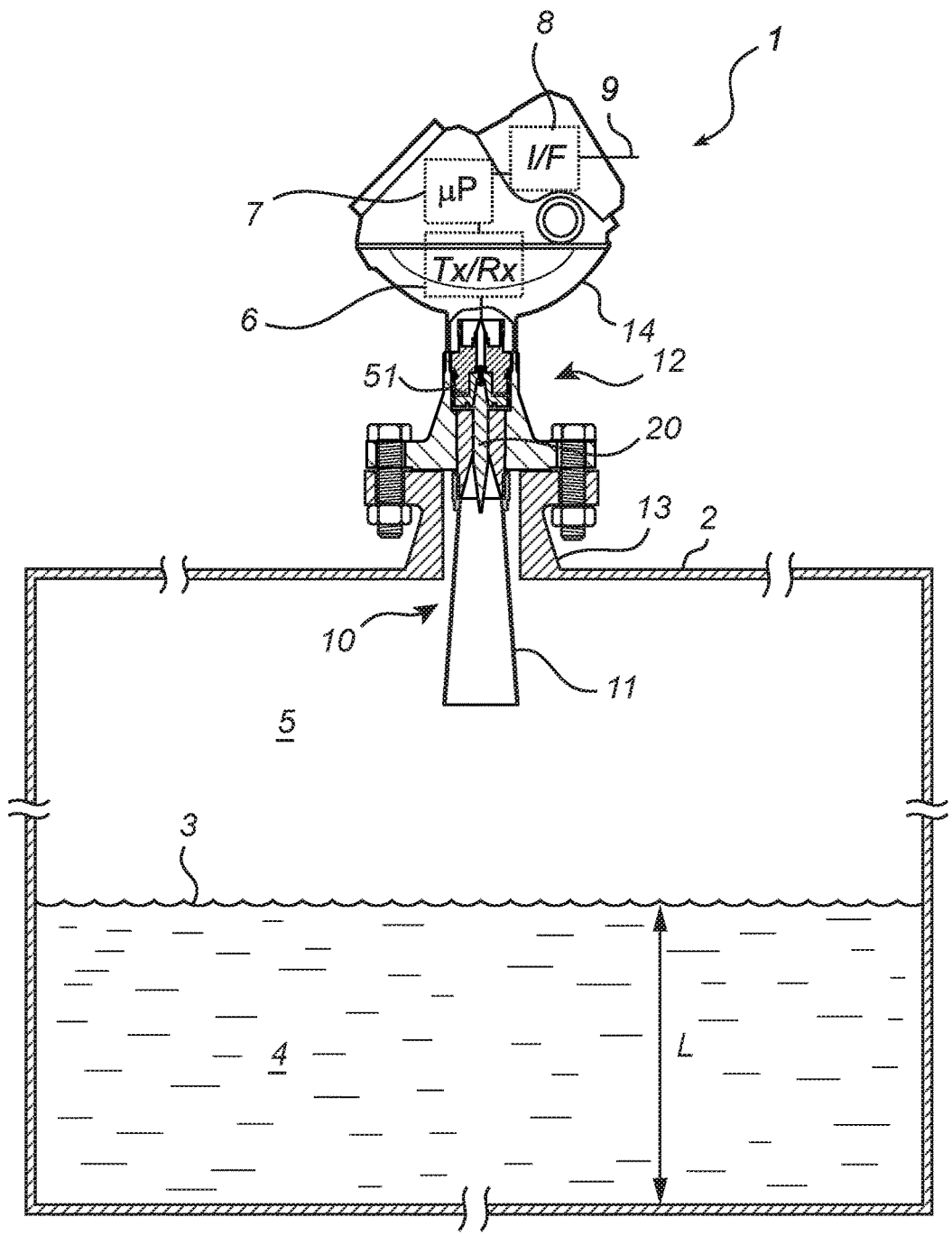
FIG. 1 is a schematic cross section view of a radar level gauge according to an embodiment of the present invention mounted on a tank.

FIG. 1 shows a schematic drawing of a radar level gauge (RLG) 1 according to an embodiment of the present invention. The RLG 1 is mounted on a tank 2, and arranged to perform measurements of a process variable such as the level L of an interface 3 between two materials 4, 5 in the tank 2. Typically, the first material is a liquid 4 stored in the tank, e.g. gasoline, while the second material is air or other atmosphere 5 in the tank. In some applications, the tank is a very large metal tank (diameter in the order of 10 m).

The radar level gauge 1 includes transceiver circuitry 6, processing circuitry 7 and a signal and power interface 8, all enclosed in a housing 14. The transceiver circuitry 6 is electrically connected to a suitable signal propagation device 10, here a directional antenna in the form of an antenna horn 11 extending into the tank 2. The antenna 11 is arranged to act as an adapter, transmitting free propagating electromagnetic waves into the tank 2 to be reflected by the interface, here the surface 3 of the product 4 in the tank 2.

The transmit signal is typically in the GHz range, e.g. around 6 GHz or 26 GHz. It may be a continuous signal with varying frequency (frequency modulated continuous wave, FMCW), or it can be a modulated pulse. Also other types of transmit signals are possible.

The RLG 1 further comprises a tank feed through structure 12, adapted to provide a preferably pressure sealed passage for electromagnetic signals through the wall of the tank, thereby allowing transmission of transmit signals and return signals between the transceiver circuitry 6 and the antenna 11.

The tank feed through structure 12 comprises a hollow wave guide 20 which serves to guide electromagnetic signals between the circuitry and the antenna 11. Signals from the transceiver 6 are fed into the upper end of the waveguide by a suitable feeder (not shown) connected to the transceiver and adapted to couple electromagnetic signals between the transceiver and the hollow wave guide. The signals are then allowed to propagate into the antenna and emitted into the tank. Reflected return signals are received by the antenna and fed into the lower end of the waveguide, and then coupled by the feeder back to the transceiver circuitry.

Figure 2:
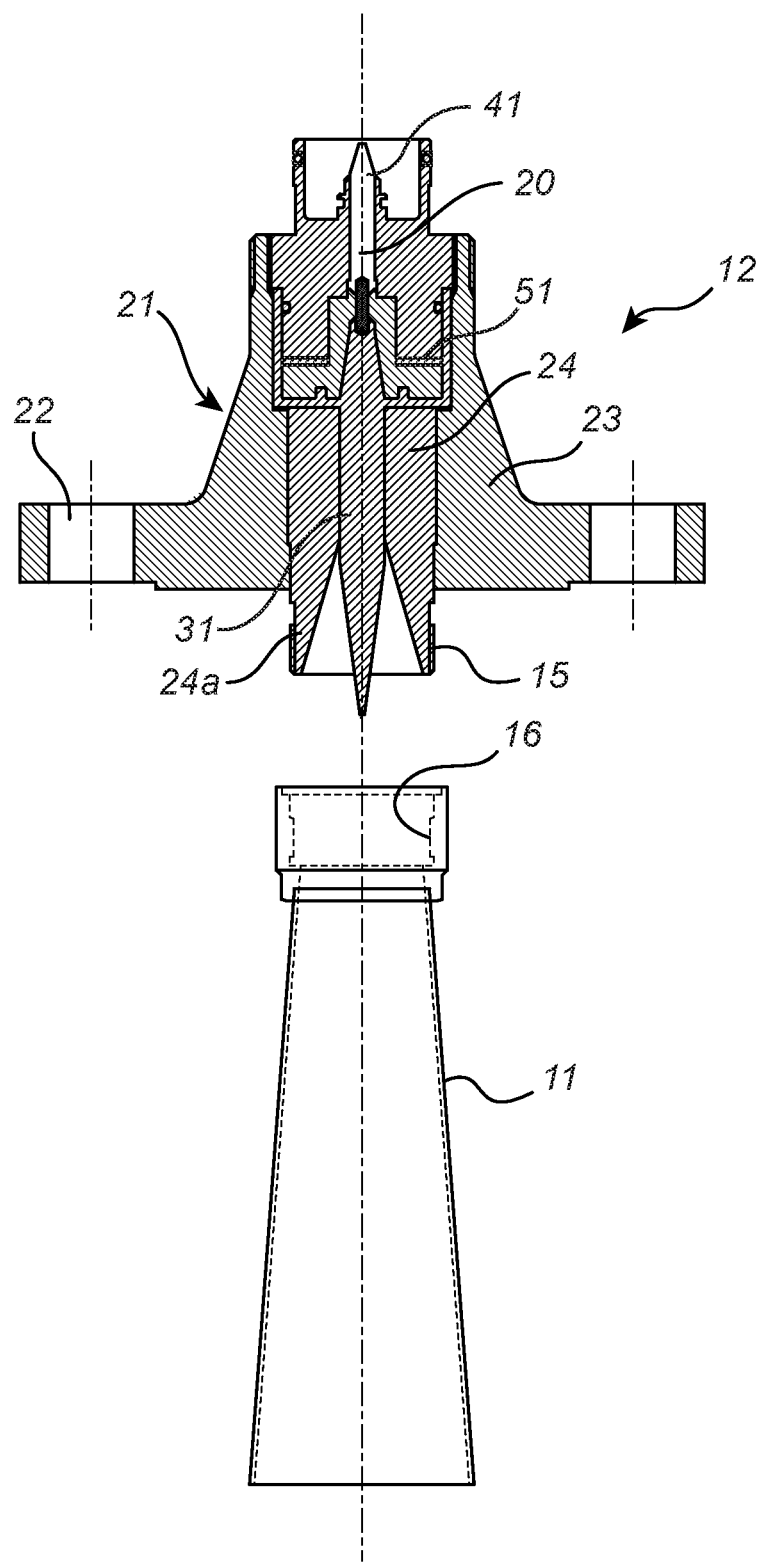
FIG. 2 is a cross section view of the tank feed through structure and antenna horn in FIG. 1.

With reference to FIG. 2, the antenna 11 is mounted to the tank feed through structure 12, on the side facing the interior of the tank. For this purpose, the structure 12 is provided with a threading 15, and the antenna horn 11 is provided with a corresponding threading 16. The housing 14 of the RLG is mounted on the other side of the structure 12, facing the exterior of the tank. Various mechanical and electrical connections of the housing 14 and its circuitry 6, 7 may be possible, and are not discussed in detail here.

The wave guide 20 is here filled with a dielectric material 31, 41. In this particular case, the RLG is designed for an operating frequency of around 26 GHz, and the wave guide may then have a diameter in the order of 5 mm, but the exact diameter will depend on the dielectric material filing the hollow wave guide 20.

Figure 3:
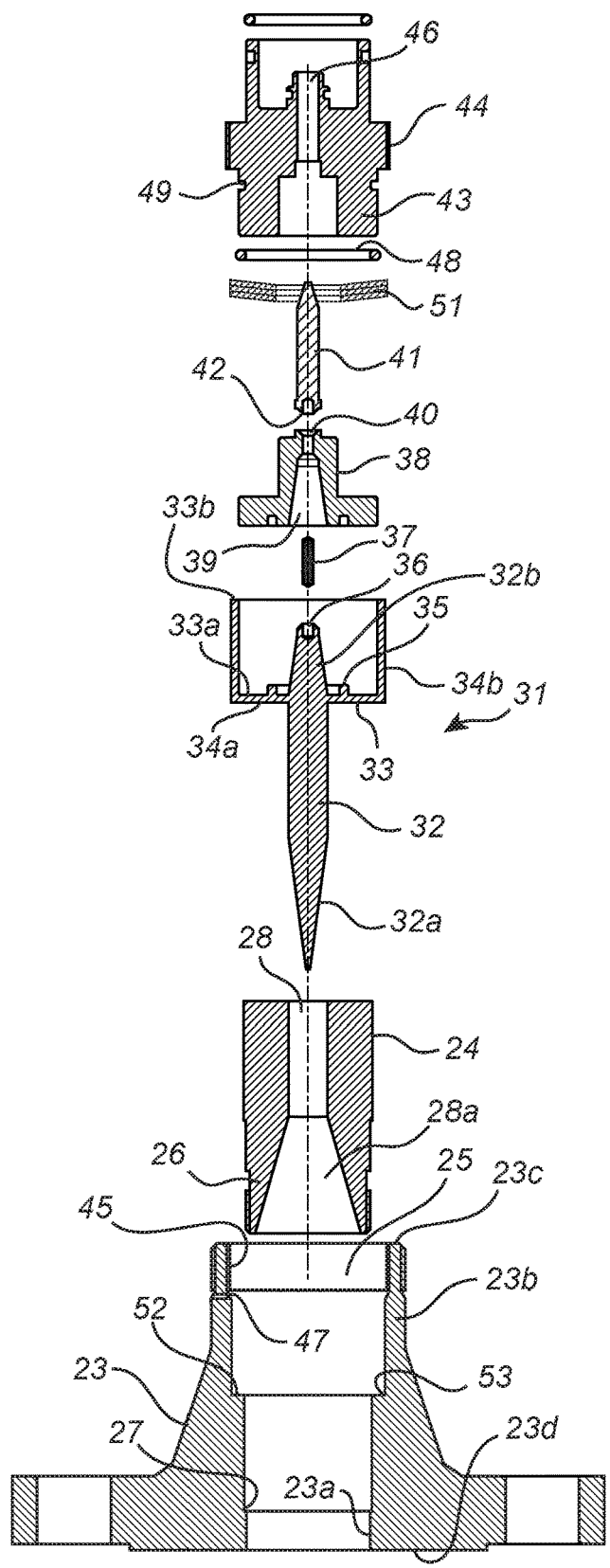
FIG. 3 is an exploded cross section of the tank feed through structure in FIG. 2.

The feed through structure 12 is shown in more detail in FIG. 3. The feed through structure 12 here comprises a tank connection 23 made of a metal material, typically steel, which is adapted to be securely fitted to the tank flange 13 (see FIG. 1). For this purpose the tank connection 23 may have holes 22 for bolts or other fasteners (not shown). Alternatively, it may be adapted to be welded to the tank flange 13.

In the illustrated case, a tank connection adaptor 24 is arranged to be fitted into a central opening 25 of the tank connection 23. The purpose of the adaptor 24 is to allow use of one common tank connection for fitting various coupling arrangements suitable for different signal propagation devices (antennas, wave guiding structures, transmission line probes, etc). The adaptor 24 is suspended by the tank connection 23, here by means of an annular protrusion 26 of the adaptor 24 which rests against an annular abutment 27 in the opening 25. Alternatively, the opening 25 may be conically tapered, and the adaptor then has a matching shape. The adaptor 24 may be press fitted or otherwise secured in the opening 25.

In the illustrated case, the adaptor 24 is suspended in a lower (interior facing) portion 23a of the tank connection 23, so that an upper (exterior facing) portion 23b of the tank connection 23 extends above the adaptor 24. The adaptor 24 may alternatively be flush with the upper surface 23c of the tank connection structure, or even extend above the surface 23c. Further, in the illustrated example, the lower (interior facing) portion 24a of the adaptor 24 extends beyond the bottom surface 23d of the tank connection 23. The threading 15 for the antenna 11 is formed on the peripheral surface of this lower portion 24a. It is noted that in other embodiments the threading 15 may be provided on the interior side of the tank connection 23.

The adaptor 24 acts as a first wave guide forming member, and has a channel 28 that forms an inner portion of the wave guide 20. The bottom portion 28a of the channel is outwardly tapered, i.e. becomes wider closer to the interior of the tank, to provide matching with the antenna horn 11. A first dielectric filling member 31 is arranged to prevent tank content from entering the channel 28. Suitable materials, such as PTFE, are relatively soft especially at elevated temperatures. The member 31 has an elongated center portion 32 and a collar portion 33 extending radially outwards from the center portion 32.

In the illustrated case, the collar portion further extends axially along the center portion 32. The collar portion 33 thus forms a cup-shape with an opening facing away from the tank. It is noted that the opening of the cup-shape also could be arranged to face towards the tank.

In the illustrated case, the collar portion 33 is shaped almost like a bucket, and has a disc-shaped portion 34a extending radially out from the center portion, and a cylindrical portion 34b extending upwards from the peripheral edge of the disc-shaped portion 34a, along the axis of center portion 32. The cylindrical portion 34b and the center portion 32 are here co-axial.

On the upper surface 33a of the collar portion 33 (here on the disc-shaped portion 34a) there may further be formed an annular protrusion 35, formed to act as a quarter wave choke, preventing electromagnetic energy to escape from the wave guide. Such an electromagnetic trap may be obtained by other means, e.g. by suitable dimension of the radial distance between the center portion 32 and the cylindrical portion 34b.

The center portion 32 has a tapered lower end 32a which extends into the tapered portion 28a of the channel 28. The upper end 32b of the center portion 32 is also slightly tapered, and has in its end an indentation 36 for receiving a second dielectric filling member, here in the shape of a pin 37.

The pin 37 is made of a structurally strong and temperature resistant material. The pin should withstand temperatures at least up to 250 degrees Celsius, and preferably as high as 500 degrees Celsius. Examples of suitable materials are resin, glass and aluminum oxide.

The pin 37 is held in place by a metal clamping member 38, adapted to fit in the interior of the bucket, and having an inner space 39 formed to receive the upper end 32b of the center portion 32. This inner space 39 thus forms an outer portion of the hollow wave guide 20. The clamping member 38 has an opening 40 through which the pin 37 extends, which opening thus forms a short section of the wave guide 20. A further wave guide dielectric filling element 41 is arranged on the clamping member 38, and has in its lower end an indentation 42 adapted to receive the pin 37.

The pin 37 is held in place so as to be fixed at least in an axial direction away from the tank. For example, the pin 37 may be unattached, but abut against an abutment in the metal element 38 above the pin 37. Alternatively, the pin 37 is attached to the metal element 38. For example, if the pin 37 is made of aluminum oxide, it may be brazed to the element 38.

The pin 37 serves to prevent that a relatively soft dielectric wave guide filling element 31 is pushed out of the channel 28 by the pressure inside the tank, in particular during conditions of elevated temperatures. With this design, a feed through structure designed for 26 GHz with a wave guide filling of PTFE closest to the antenna, can withstand pressures of up to 100 bar in temperatures of up to 250 degrees Celsius.

The tank feed through structure 12 further comprises a metal fastening member 43 with a bore 46. The bore surrounds the second wave guide filling element 41 to form yet another portion of the hollow wave guide 20. The fastening member 43 is arranged to be secured to the tank connection 23 such that the wave guide filling elements 31 and 41, as well as the pin 37 and clamping member 38, are all sandwiched between the tank connection 23 and the fastening member 43. In the illustrated case, the fastening member 43 has an outer threading 44, corresponding to a threading 45 on the inside of the upper portion 23*b* of the tank connection 23, so that the fastening member 43 can be securely threaded in place.

A spring member 51, e.g. an annular spring such as a Belleville washer, is arranged around the waveguide 20 between the fastening member 43 and the clamping member 38, so as to press the clamping member 38 towards the tank connection 23. It is noted that the spring member does not need to be annular. It just needs to apply a sufficiently evenly distributed force on the clamping member. Alternatives to an annular spring member may be a coil spring, a C-ring or even a set of springs distributed around the central axis.

The spring member should apply a controlled and well defined force on the clamping member, in order to ensure satisfactory sealing by the collar portion 33. The required force is determined by the pressure in the tank, the temperature, and the surface area of the sealing. In the illustrated case the relevant surface area is the area of the annular abutment 52.

It is noted that in FIG. 3, three Belleville washers are illustrated. By using several separate spring members, the spring constant—and thus the force applied by the spring member—may be adapted to the specific application.

It may be advantageous to avoid complete compression of the spring member, i.e. to leave some room for expansion. As a practical example, the spring member 51 in FIG. 3 can be adapted to exert a maximum pressure of around 25 kN when fully compressed, but be compressed to exert only around 22 kN.

It is noted that the temperature persistence of the spring member 51 need to be greater than the surrounding structure (tank connection, fastening member, etc), in order to ensure a satisfactory function.

The biasing member thus applies a pressure on the radial portion 33 of the collar portion which is sandwiched between the clamping member 38 and an annular abutment 52 of the tank connection 23. The pressure thus applied to the radial portion 33 ensures that this portion of the filling member 31 can serve as a process seal, effectively sealing the interior of the tank from the outside. The upper surface 53 of the abutment 52 may be serrated, in order to improve the contact with the dielectric material in the collar portion. In order to make the sealing reliable, the radial portion 33 preferably has a material thickness significantly smaller than the diameter of the member 31. As an example, the thickness of the material of the radial portion is less than 5 mm, preferably less than 3 mm, e.g. around 2 mm.

It may be advantageous to also provide an additional sealing between the filling member 31 and the exterior, e.g. to avoid penetration of moisture or condensation from the exterior into the gauge. For this purpose, a sealing element such as an O-ring 48 may be provided between the inside of the cylindrical portion 34 and the fastening member 43. The fastening member 43 is preferably provided with a groove 49 to receive the o-ring 48. The material thickness of the collar portion 33 (here the cylinder portion 34*b*) is preferably much smaller than the diameter of the member 31, thus leading to smaller potential heat expansion.

The peripheral edge 33*b* of the collar portion (here of cylindrical portion 34*b*) is located a short distance below the threaded portion 45, and one or several ventilation channels 47 are formed in the tank connection 23 and/or the fastening member 43 to thereby provide a fluid connection between the outer rim 34*a* and the exterior of the tank. Any leakage or condensation, that has passed the tank seal formed by the pressurized radial portion 33, will therefore be guided by the outer surface of the collar portion, and exit the tank feed through structure through the channels 47. Such leakage or condensation is thus prevented from penetrating the sealing element 48 and thereby enter the gauge electronics.

Figure 4A:
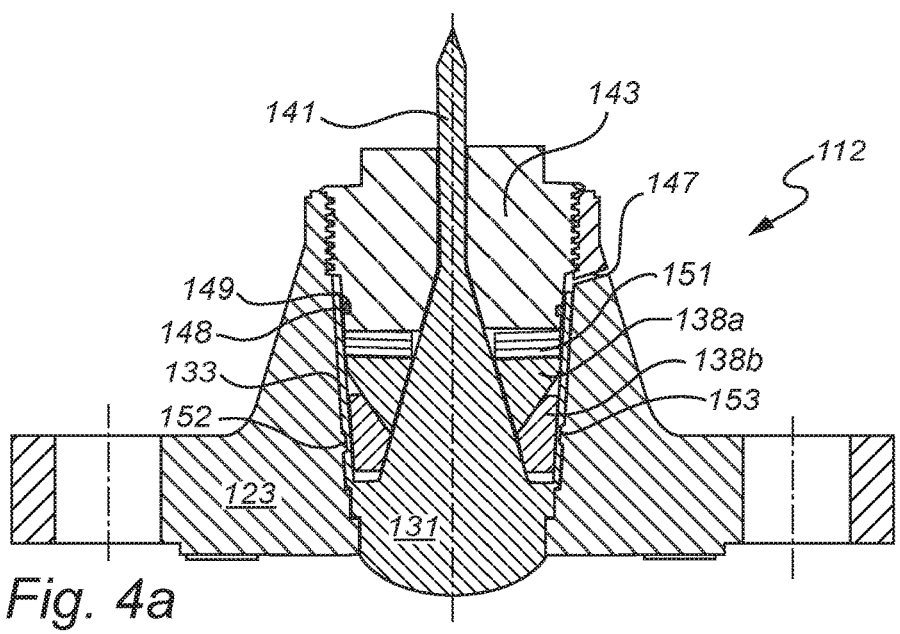
FIG. 4*a* is a cross section of a tank feed through structure according to another embodiment of the invention.
Figure 4B:
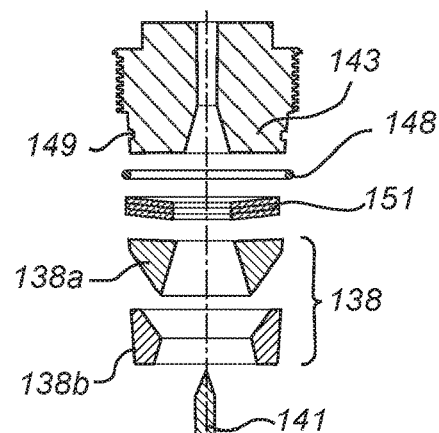
FIG. 4*b* is an exploded cross section of the tank feed through structure in FIG. 4*a*.
Figure 4B:
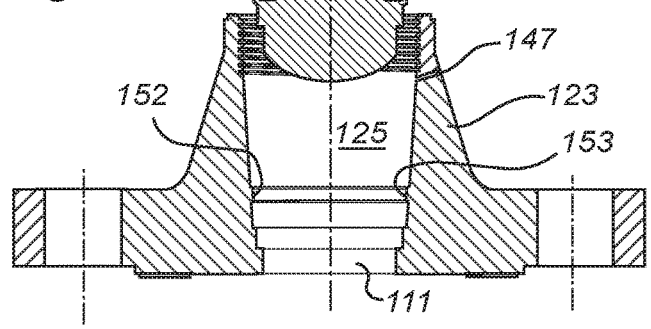

FIGS. 4*a*-*b* show an alternative embodiment of a tank feed through structure 112 according to the present invention. A housing of an RLG is intended to be mounted on the feed through structure in a similar way as indicated in FIG. 1, and these parts of the RLG will not be described further here.

In this embodiment, the interior end of the tank connection 123, i.e. the part extending into the tank, is formed to serve as an outer shell of the directional antenna 111. Also here, the antenna 111 is connected to the transceiver (not shown) via a hollow wave guide 120. A first dielectric filling member 131 is provided in the antenna opening, to prevent tank content from entering the antenna. A second dielectric filling member 141 is provided in the wave guide 120. In the illustrated case, the first and second filling members 131, 141 are formed in one piece.

The first dielectric member 131, i.e. the dielectric filling of the antenna 111, is provided with an annular collar portion 133, resting against an annular abutment 152 formed on the inside of the tank connection 123. The abutment may have a serrated surface 153.

An annular clamping member 138 is arranged in the opening 125 of the tank connection 123, so that the collar portion 133 is sandwiched between the abutment 152 and the clamping member 138. A fastening member, here in the form of a threaded cap 143, is secured to the upper part 123*b* of the tank connection 123, and a spring member 151, here in the form three stacked Belleville washers, is fitted between the fastening member 143 and the clamping member 138. The spring member 151 ensures that the collar portion 133 of the filling member 131 is subject to a controlled pressure, so that the collar portion 133 may serve as a process seal.

It is noted that in FIG. 4*a*-4*b*, the collar portion 133 is pressed almost completely radially against the inner wall of the tank connection. The opening 125 of the tank connection therefore has a slightly tampered shape, so that pressing the clamping member 138 into the opening generates the required pressure.

In the illustrated case, the clamping member 138 is formed by two separate pieces 138*a*, 138*b*. The pieces may be of suitable structurally strong material, e.g. metal or ceramics. The contacting surface between the two pieces is conical, i.e. it is tilted with respect of the longitudinal axis of the tank connection. This allows for the clamping member to convert the axial force applied by the spring member into a force having also a radial component.

Similar to FIG. 3, an additional sealing may be provided to avoid penetration of moisture or condensation from the exterior into the gauge. For this purpose, a sealing element such as an o-ring 148 may be provided between the inside of the collar portion 133 and the fastening member 143. The fastening member 143 is preferably provided with a groove 149 to receive the o-ring 148. The material thickness of the collar portion 133 is preferably much smaller than the diameter of the member 131, thus leading to smaller potential heat expansion.

Also similar to FIG. 3, the tank feed through structure 112 may include ventilation channels 147, providing a fluid connection of the peripheral edge of the collar portion 133 and the exterior. These channels 147 are formed immediately below the threading of the fastening member 143, i.e. outside any outer sealing member 148.

The person skilled in the art realizes that the present invention by no means is limited to the preferred embodiments described above. On the contrary, many modifications and variations are possible within the scope of the appended claims. For example, the annular collar portion does not necessarily have a flat portion and a cylindrical portion, but may have the shape of a rounded cup. As indicated in FIGS. 4a-b it may also have a funnel-shape, e.g. comprising a conical surface with its base facing out of the tank.

Further, the expression annular is not restricted to a continuous annular shape. For example, an annular member, such as the annular clamping member, may be formed by several pieces, e.g. two semi-annular pieces.

What is claimed is:

1. A radar level gauge using electromagnetic waves for determining a filling level of a product in a tank, said radar level gauge comprising:
    a transceiver for transmitting an electromagnetic transmit signal and receiving an electromagnetic echo signal;
    processing circuitry connected to said transceiver for determining said filling level based on said electromagnetic echo signal;
    a directional antenna for directing said electromagnetic transmit signal towards a surface of said product and to return a reflection from said surface as said electromagnetic echo signal;
    a hollow wave guide connecting said transceiver with said antenna,
    a tank connection arranged to be sealingly secured to the tank, said fixed tank connection having a through hole with an annular abutment;
    a dielectric filling member arranged in the tank connection and configured to prevent entry of tank content into the antenna and/or hollow wave guide, the dielectric filling member comprising an annular collar portion resting against said annular abutment;
    a clamping member inserted into the tank connection, such that the annular collar portion is sandwiched between the annular abutment and the clamping member;
    a fastening member attached to said fixed tank connection thereby securing said clamping member between said fastening member and said annular abutment; and
    a spring member arranged between said fastening member and said clamping member, and configured to press said clamping member towards the annular abutment, so as to apply a sufficiently controlled pressure on said annular collar portion, such that said annular collar portion in itself provides a pressure tight sealing between a tank interior and a tank exterior.

2. The radar level gauge according to claim 1, wherein the pressure tight sealing is adapted to withstand pressures up to 100 Bar at room temperature.

3. The radar level gauge according to claim 1, wherein the pressure tight sealing serves as a tank seal.

4. The radar level gauge according to claim 1, wherein the pressure tight sealing is the only pressure tight sealing between the tank interior and the exterior.

5. The radar level gauge according to claim 1, wherein the annular abutment is provided with a serrated surface.

6. The radar level gauge according to claim 1, wherein at least a portion of the through hole of the tank connection forms an inner part of the hollow wave guide, which is filled by the dielectric filling member.

7. The radar level gauge according to claim 6, wherein the clamping member comprises a channel forming an outer part of the hollow wave guide.

8. The radar level gauge according to claim 7, wherein the dielectric filling member is made of a first dielectric material, and wherein said wave guide arrangement further comprises an outer dielectric filling member made of a second dielectric material, which outer dielectric filling member is arranged in said outer wave guide part so as to be fixed in said wave guide at least in a direction out from said tank, and wherein said second dielectric material is configured to withstand temperatures up to 250 degrees Celsius.

9. The radar level gauge according to claim 8, wherein said second dielectric material is configured to withstand temperatures up to 500 degrees Celsius.

10. The radar level gauge according to claim 8, wherein said second dielectric material is selected from the group of ceramics, epoxy resin, glass and aluminum oxide.

11. The radar level gauge according to claim 1, wherein at least a portion of the through hole of the tank connection forms part of the directional antenna, which is filled by the dielectric filling member.

12. The radar level gauge according to claim 1, wherein at least a portion of the directional antenna is attached to an interior end of said tank connection.

13. The radar level gauge according to claim 1, further comprising a tank connection adaptor inserted in the tank connection, and arranged to rest against an interior annular abutment formed in the tank connection, wherein said tank connection adaptor comprises a channel forming an inner part of the hollow waveguide, which is filled by the dielectric filling member.

14. The radar level gauge according to claim 1, wherein the clamping member comprises a channel forming an outer part of the hollow wave guide.

15. The radar level gauge according to claim 1, further comprising at least one ventilation passage between said annular collar portion and the tank exterior.

16. The radar level gauge according to claim 15, wherein the at least one ventilation passage extends from a peripheral edge of the annular collar portion to the tank exterior.

17. The radar level gauge according to claim 15, further comprising an outer sealing element arranged between said at least ventilation passage and an outer portion of the waveguide.

18. The radar level gauge according to claim 1, further comprising an outer sealing element arranged between said annular collar portion and said fastening member.

19. The radar level gauge according to claim 1, wherein the annular collar portion comprises an essentially horizontal, flat annular disc portion.

20. The radar level gauge according to claim 1, wherein the annular collar portion has an axial extension along a longitudinal axis of said hollow wave guide to form a cup-shape.

21. The radar level gauge according to claim 20, wherein said cup-shaped annular collar portion comprises an essentially horizontal, flat annular disc portion and an essentially cylindrical wall portion extending from a peripheral edge of the disc portion and coaxially surrounding the clamping portion.

22. The radar level gauge according to claim 1, wherein said controlled pressure has a radial component.

23. The radar level gauge according to claim 1, wherein the spring member has a linear spring constant, so that a force applied by the spring member is proportional to a compression of the spring.

24. The radar level gauge according to claim 1, wherein a surface of said annular collar portion is provided with at least one annular protrusion, concentric with a longitudinal axis of the through hole, said annular protrusion being formed to act as a quarter wave choke to prevent electromagnetic energy from escaping from said antenna and/or said wave guide.

25. The radar level gauge according to claim 1, wherein a material thickness of the annular collar portion is less than 5 mm.

26. The radar level gauge according to claim 1, wherein a material thickness of the annular collar portion is less than 3 mm.

27. The radar level gauge according to claim 1, wherein said dielectric filling member is made of a material selected from the group of PTFE (polytetrafluoroethylene), PFA (perfluoroalkoxy alkane), FEP (fluorinated ethylene propylene), PPS (polyphenylene sulfide), and PEEK (polyether ether ketone).

* * * * *